United States Patent
Woo et al.

(10) Patent No.: US 8,720,394 B2
(45) Date of Patent: May 13, 2014

(54) VARIABLE COMPRESSION RATIO APPARATUS WITH DUAL ECCENTRIC LINKS

(75) Inventors: Yoonsik Woo, Yongin-si (KR); Dongseok Lee, Hwaseong-si (KR); Jeichoon Yang, Yongin-si (KR); Changho Yang, Hwaseong-si (KR); Eunho Lee, Hwaseong-si (KR); Jinkook Kong, Suwon-si (KR); Soohyung Woo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 244 days.

(21) Appl. No.: 13/296,980

(22) Filed: Nov. 15, 2011

(65) Prior Publication Data
US 2013/0042837 A1  Feb. 21, 2013

(30) Foreign Application Priority Data
Aug. 18, 2011 (KR) .................. 10-2011-0082268

(51) Int. Cl.
*F02B 75/04* (2006.01)

(52) U.S. Cl.
USPC .............. 123/48 B; 123/78 BA; 123/78 E

(58) Field of Classification Search
USPC ...... 123/48 R, 48 B, 78 R, 78 B, 78 BA, 78 E
See application file for complete search history.

(56) References Cited

U.S. PATENT DOCUMENTS

| 6,581,552 B2 | 6/2003 | Kreuter |
| 7,028,647 B2 | 4/2006 | Styron |

FOREIGN PATENT DOCUMENTS

| JP | 2009-41511 A | 2/2009 |
| KR | 10-2010-0138332 A | 12/2010 |
| KR | 10-2011-0001511 A | 1/2011 |
| KR | 10-2011-0001520 A | 1/2011 |
| KR | 10-1028181 B1 | 4/2011 |
| KR | 10-2011-0062143 A | 6/2011 |

*Primary Examiner* — Noah Kamen
(74) *Attorney, Agent, or Firm* — Morgan, Lewis & Bockius LLP

(57) ABSTRACT

A variable compression ratio (VCR) apparatus with dual eccentric links is mounted on an engine, receives combustion power of a fuel-air mixture from a piston to rotate a crank shaft and changes a compression ratio of the fuel-air mixture. The VCR apparatus may include a connecting rod having a large end portion formed at one end thereof, which is connected to the crank shaft to receive a torque of the engine, and a small end portion formed at the other end thereof, the small end portion having a coupling hole formed therein, a pair of eccentric links having one ends coupled to the coupling hole from both sides facing each other and integrally rotating, and an eccentric rod connected to the other ends of the eccentric links and rotating within a predetermined angle range. The eccentric rod may be a pair of eccentric rods.

5 Claims, 3 Drawing Sheets

VARIABLE COMPRESSION RATIO APPARATUS WITH DUAL ECCENTRIC LINKS

CROSS-REFERENCE TO RELATED APPLICATIONS

The present application claims priority of Korean Patent Application Number 10-2011-0082268 filed Aug. 18, 2011, the entire contents of which application is incorporated herein for all purposes by this reference.

BACKGROUND OF INVENTION

1. Field of Invention

The present invention relates to a variable compression ratio (VCR) apparatus, and more particularly, to a VCR apparatus with dual eccentric links.

2. Description of Related Art

In general, the thermal efficiency of an engine increases when a compression ratio is high. In the case of a spark ignition engine, when ignition timing is advanced to a predetermined level, the thermal efficiency thereof increases.

In the spark ignition engine, however, when the ignition timing is advanced at a high compression ratio, abnormal combustion may occur to damage the engine. Therefore, there is a limit to advancing the ignition timing, and thus a power reduction inevitably occurs.

A VCR apparatus refers to an apparatus for changing a compression ratio of a fuel-air mixture according to an operation state of an engine.

The VCR apparatus increases the compression ratio of the fuel-air mixture to improve fuel efficiency, at a low load condition of the engine. Furthermore, the VCR apparatus reduces the compression ratio of the fuel-air mixture to prevent the occurrence of knocking and improve the engine power, at a high load condition of the engine.

The VCR apparatus according to the related art includes a connecting rod connected to a piston and receiving combustion power of the fuel-air mixture, a pin link receiving the combustion power of the fuel-air mixture from the connecting rod and rotating a crank shaft, and a controller changing a rotating trace of the pin link according to an operation condition of the engine.

In the VCR apparatus according to the related art, the compression ratio of the fuel-air mixture is changed as the rotating trace of the pin link is changed.

FIG. 1 illustrates a VCR apparatus for changing a compression ratio as described above, which has been disclosed in U.S. Pat. No. 6,581,552. Referring to FIG. 1, an eccentric member 3 is swung with respect to one side surface of a connecting rod 1 by an eccentric control link 2, and an eccentric ring 3a formed at a small end portion 1a of the connecting rod 1 is eccentrically formed. Accordingly, a piston pin coupled to the eccentric ring 3a varies the height of the piston pin through the control of the eccentric member 3, thereby changing a compression ratio.

In the VCR apparatus according to the above-mentioned patent, a guide member 4 is formed on one side surface of eccentric member 3, and a guide groove is coupled to connecting rod 1 so as to correspond to guide member 4. That is, since the VCR apparatus has a cantilever structure in which guide member 4 is formed, the VCR apparatus has a problem in that torsion occurs in a vertical direction with respect to the center of a rotating shaft, during the rotation about the eccentric ring 3a.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been directed to provide a VCR apparatus having a structure which is in general left and right symmetrical about a connecting rod.

Other aspects of the present invention have been directed to provide a VCR apparatus with dual eccentric links, that is mounted in an engine, receives combustion power of a fuel-air mixture from a piston to rotate a crank shaft and changes a compression ratio of the fuel-air mixture. The VCR apparatus may include a connecting rod having a large end portion formed at one end thereof, which is connected to the crank shaft to receive a torque of the engine, and a small end portion formed at the other end thereof, the small end portion having a coupling hole formed therein, a pair of eccentric links having one ends coupled to the coupling hole from both sides facing each other and integrally rotating, and an eccentric rod connected to the other ends of the eccentric links and rotating within a predetermined angle range. The eccentric rod may be a pair of eccentric rods.

One eccentric link may include an insertion protrusion provided at an end thereof and having a through-hole formed therein such that a piston pin of the piston is eccentrically inserted into the insertion protrusion, and the other eccentric link may include a plurality of attachment protrusions provided at one end thereof such that the attachment protrusions fit into an outer circumferential surface of the insertion protrusion.

The eccentric rod may include a through-hole provided at one end thereof and perforated in a shaft direction, and an actuator for controlling the revolution angle of the eccentric rod may be coupled through the through-hole.

The actuator may be connected to the crank shaft by a separate link member connected to the through-hole and control the revolution angle of the eccentric rod.

The connecting rod may include protrusions formed on both side surfaces thereof, the protrusions protruded along the edges of the respective surfaces.

According to the above-described VCR apparatus with dual eccentric links, since the eccentric links mounted in the small end portion of the connecting rod are coupled in both sides, the load may be uniformly distributed into the eccentric links, the piston pin, and the small end portion of the connecting rod.

Further, since a guide member installed in a cantilever structure may be omitted, it is possible to obtain an effect of cost reduction.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
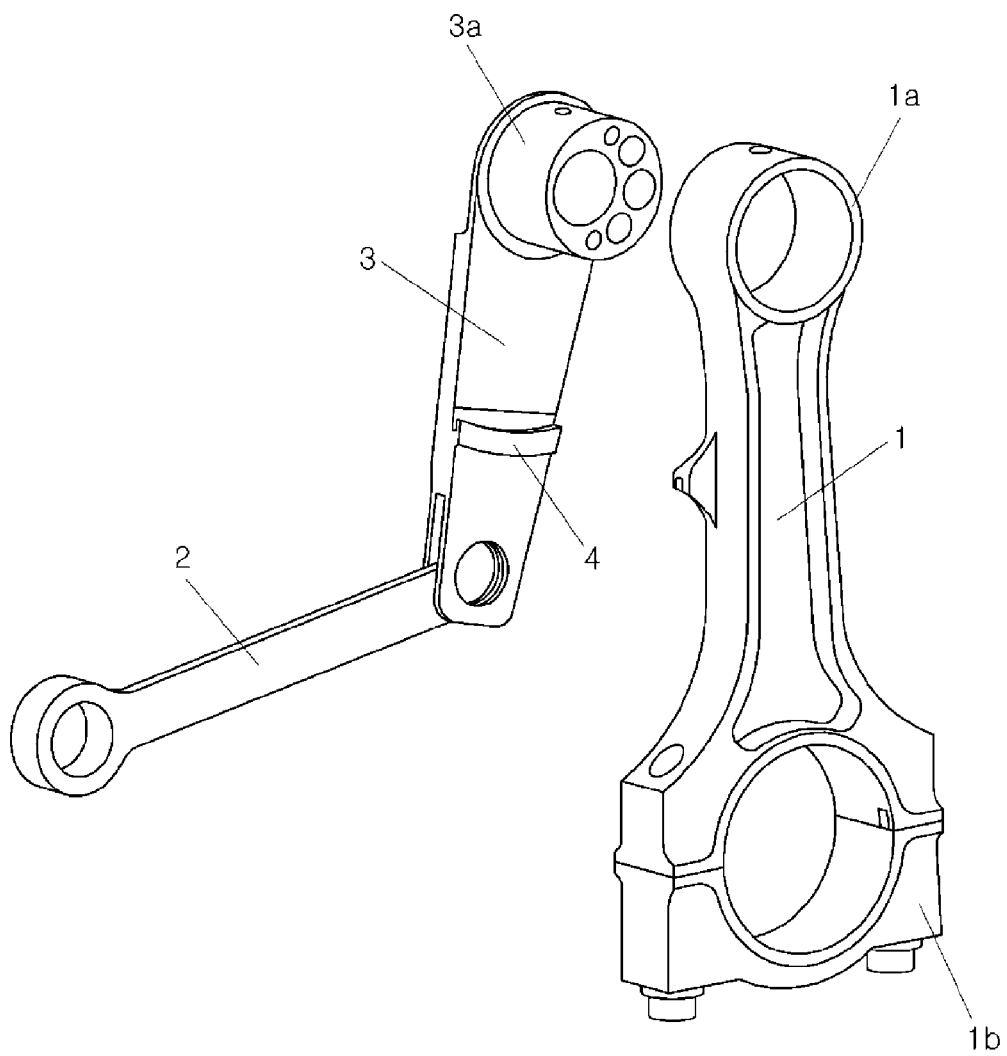
FIG. 1 is an exploded perspective view of a VCR apparatus according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
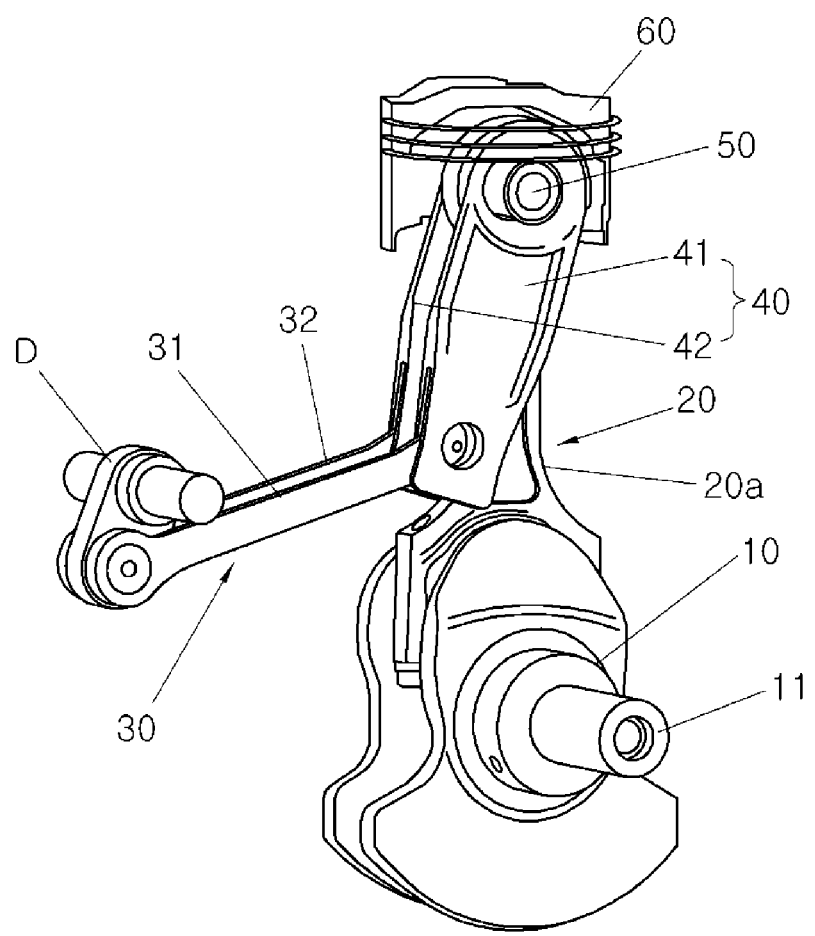
FIG. 2 is an assembled perspective view of an exemplary VCR apparatus with dual eccentric links according to the present invention.
Figure 3:
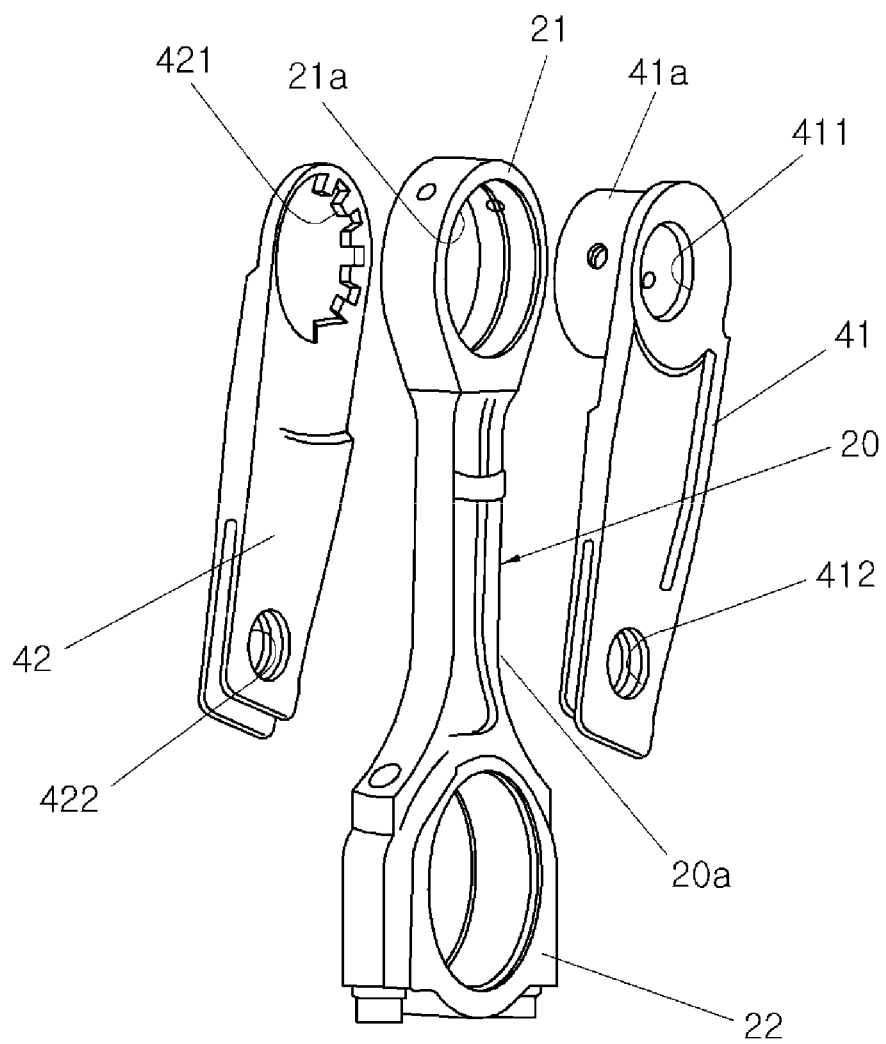
FIG. 3 is an exploded perspective view of the exemplary VCR apparatus with dual eccentric links according to the present invention.

Referring to FIGS. 2 and 3, the VCR apparatus with dual eccentric links according to various embodiments of the present invention includes a crank shaft 10, a connecting rod 20, a pair of eccentric rods 30, a pair of eccentric links 40, and a piston 60.

Crank shaft 10 receives combustion power of a fuel-air mixture through the connecting rod 20. Connecting rod 20 includes both end portions consisting of a small end portion 21 and a large end portion 22. Small end portion 21 is formed to have a smaller diameter than that of large end portion 22 such that piston 60 is coupled by a piston pin 50, and large end portion 22 is formed to have a larger diameter than that of small end portion 22 and coupled to crank shaft 10.

Connecting rod 20 includes protrusions 20a formed on both side surfaces thereof Protrusions 20a are formed along the edges of both side surfaces of connecting rod 20 such that the edges are protruded. Therefore, protrusions 20a may serve to prevent the torsion of eccentric links 40 to be described below in a vertical direction with respect to a rotating shaft.

Piston 60 vertically reciprocates inside a cylinder, and a combustion chamber is formed between piston 60 and the cylinder.

Crank shaft 10 converts the reciprocation of piston 60 into a rotary force, and transmits the rotary force to a transmission. The crank shaft 10 is mounted in a crank case formed under the cylinder.

Small end portion 21 of connecting rod 20 is connected to one ends of eccentric links 40. The pair of eccentric links 40 are coupled to face each other with small end portion 21 interposed therebetween.

One eccentric link 40 has an insertion protrusion 41a formed thereon such that the eccentric link is closely attached and coupled to the internal circumferential surface of small end portion 21. In this case, as an eccentric hole 411 is formed in the center of insertion protrusion 41a so as to be perforated in the shaft direction, the piston pin 50 for coupling piston 60 may be inserted into eccentric hole 411. Eccentric hole 411 is formed in an eccentric shape such that the center of piston pin 50 deviates from the center of an insertion hole 21a of small end portion 21.

The other eccentric link 40 has a plurality of attachment protrusions 421 formed therein such that attachment protrusions 421 are coupled to surround the outer circumferential surface of insertion protrusion 41a in a state in which insertion protrusion 41a is coupled through small end portion 21. That is, attachment protrusions 421 may be formed in a gear teeth shape so as to be spaced a predetermined distance from each other along the outer circumferential surface of insertion protrusion 41a and directed to the center of rotation.

The pair of eccentric rods 30 have one ends connected to the pair of eccentric links 40 and through-holes 412 and 422 formed in the other ends thereof, and through-holes 412 and 422 pass through the pair of eccentric rods 30. Furthermore, as through-holes 412 and 422 of eccentric rods 30 are connected to an actuator to drive the rotation of eccentric links 40 through the revolution control of eccentric rods 30. In this case, a separate control mechanism may be installed as the actuator. However, a separately-provided link member having one end connected to through-holes 412 and 422 of eccentric rods 30 and the other end connected to crank shaft 10 may be installed to control the revolution angle of eccentric rods 30.

In the above-described VCR apparatus with dual eccentric links according to various embodiments of the present invention, eccentric links 40 are installed in general symmetrically about connecting rod 20. Therefore, the reliability of the VCR apparatus increases in terms of load balancing.

In the case of the cantilever structure in which eccentric links 40 are rotated with respect to one side surface of connecting rod 20, a guide unit should be separately installed. As described above, however, since the eccentric links 40 are rotated at both side surfaces, the guide unit may be omitted. Therefore, it is possible to obtain an effect of cost reduction.

For convenience in explanation and accurate definition in the appended claims, the terms above or under, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio (VCR) apparatus with dual eccentric links, that is mounted on an engine, receives a combustion power of a fuel-air mixture from a piston to rotate a crank shaft and changes a compression ratio of the fuel-air mixture the VCR apparatus comprising:

a connecting rod having a large end portion formed at one end thereof, which is connected to the crank shaft to receive a torque of the engine, and a small end portion formed at the other end thereof, the small end portion having a coupling hole formed therein;

a pair of eccentric links having one ends coupled to the coupling hole from both sides facing each other and integrally rotating; and an eccentric rod connected to the other ends of the eccentric links and rotating within a predetermined angle range;

wherein one eccentric link comprises an insertion protrusion provided at one end thereof and having a through-hole formed therein such that a piston pin of the piston is eccentrically inserted into the insertion protrusion, and the other eccentric link comprises a plurality of attachment protrusions provided at one end thereof such that the attachment protrusions fit into an outer circumferential surface of the insertion protrusion.

2. The VCR apparatus as defined in claim 1, wherein the eccentric rod comprises a through-hole provided at one end thereof and perforated in a shaft direction, and an actuator for controlling a revolution angle of the eccentric rod is coupled through the through-hole.

3. The VCR apparatus as defined in claim 2, wherein the actuator is connected to the crank shaft by a separate link member connected to the through-hole, and controls the revolution angle of the eccentric rod.

4. A variable compression ratio (VCR) apparatus with dual eccentric links, that is mounted on an engine, receives a combustion power of a fuel-air mixture from a piston to rotate a crank shaft and changes a compression ratio of the fuel-air mixture, the VCR apparatus comprising:

a connecting rod having a large end portion formed at one end thereof, which is connected to the crank shaft to receive a torque of the engine, and a small end portion formed at the other end thereof, the small end portion having a coupling hole formed therein;

a pair of eccentric links having one ends coupled to the coupling hole from both sides facing each other and integrally rotating; and an eccentric rod connected to the other ends of the eccentric links and rotating within a predetermined angle range;

wherein the connecting rod comprises protrusions formed on both side surfaces thereof, the protrusions protruding along edges of the side surfaces.

5. A variable compression ratio (VCR) apparatus with dual eccentric links, that is mounted on an engine, receives a combustion power of a fuel-air mixture from a piston to rotate a crank shaft and changes a compression ratio of the fuel-air mixture, the VCR apparatus comprising:

a connecting rod having a large end portion formed at one end thereof, which is connected to the crank shaft to receive a torque of the engine, and a small end portion formed at the other end thereof, the small end portion having a coupling hole formed therein;

a pair of eccentric links having one ends coupled to the coupling hole from both sides facing each other and integrally rotating; and an eccentric rod connected to the other ends of the eccentric links and rotating within a predetermined angle range;

wherein the eccentric rod is a pair of eccentric rods.

* * * * *